United States Patent [19]

Benenati

[11] Patent Number: 5,227,179
[45] Date of Patent: Jul. 13, 1993

[54] ASSEMBLY OF INJECTION MOLDING MANIFOLD, NOZZLES AND MOLD

[76] Inventor: Salvatore Benenati, 77 Woodside Dr., Red Bank, N.J. 07701

[21] Appl. No.: 730,545

[22] Filed: Jul. 16, 1991

Related U.S. Application Data

[60] Division of Ser. No. 379,739, Jul. 12, 1989, Pat. No. 5,032,078, which is a continuation-in-part of Ser. No. 217,372, Jul. 11, 1988, abandoned.

[51] Int. Cl.$^5$ .............................................. B29C 45/22
[52] U.S. Cl. .................................. 425/547; 264/328.8; 264/328.14; 264/328.15; 425/549; 425/570; 425/572; 425/DIG. 58
[58] Field of Search ............... 425/547, 548, 549, 570, 425/571, 572, 573, 581, 588, DIG. 58, 567; 264/328.8, 328.14, 176 F, 297.2, 328.15

[56] References Cited

U.S. PATENT DOCUMENTS 4,219,323  8/1980  Bright et al. .................. 249/110
5,032,078  7/1991  Benenati .......................... 425/549

OTHER PUBLICATIONS

Mold Masters Catalog, Apr. 1986 p. 35.

*Primary Examiner*—Tim Heitbrink

[57] ABSTRACT

A heated manifold, for use in the distribution of heated plastic resins to the various cavities of injection molds for thermoplastic materials. The parts of the manifold interlock with each other and contain the high pressures generated by the injection molding presses. The components of the manifold are fitted with seals of metals dissimilar to the manifold, and with a higher coefficient of expansion than the manifold material. The system includes heater bushings which channel the plastic materials to the individual cavities and are fitted with a removable tip which can be adjusted to change the overall length of the bushing. A duct structure provides passages for the heated plastic, and electrical heaters extend generally along the passages, secured in channels in the duct structure by heater covers; a snug assembly of the heaters in the channels provides excellent heat transfer, utilizing heater covers of a metal that is mechanically forced to flow into undercuts in the channels.

10 Claims, 8 Drawing Sheets

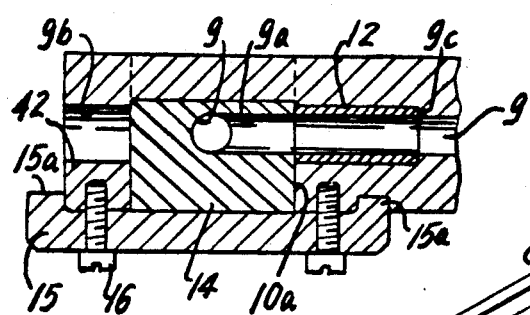
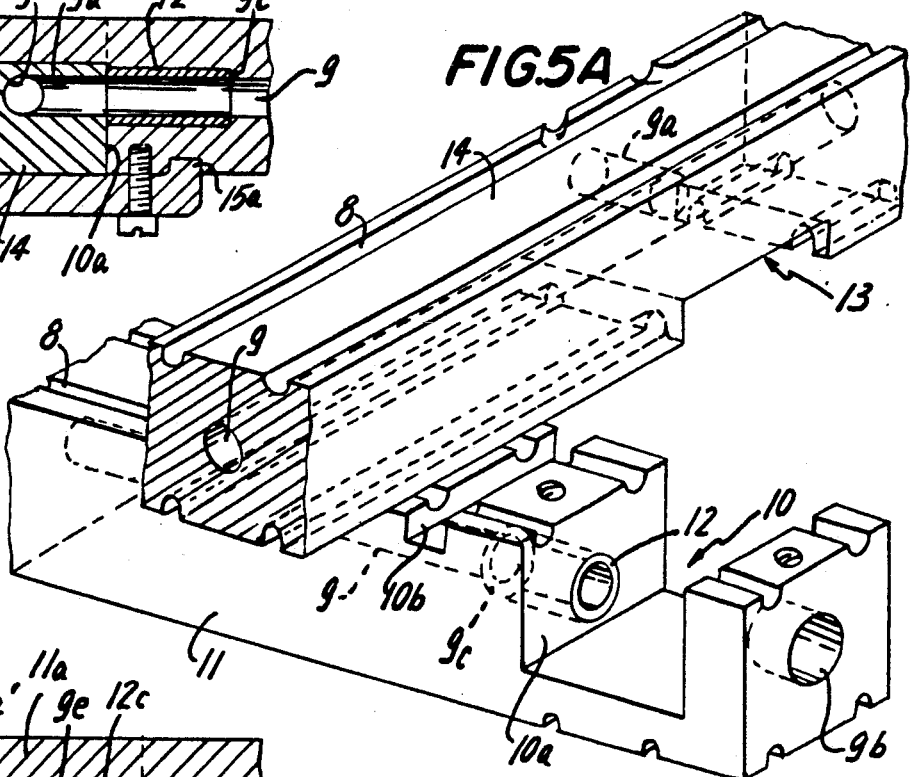
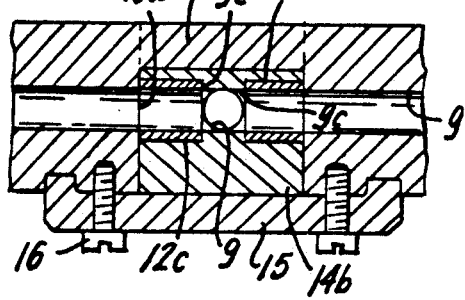
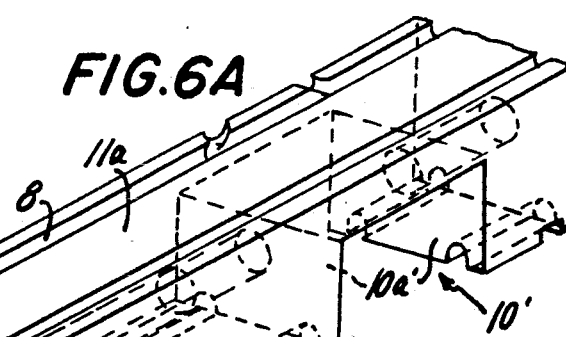
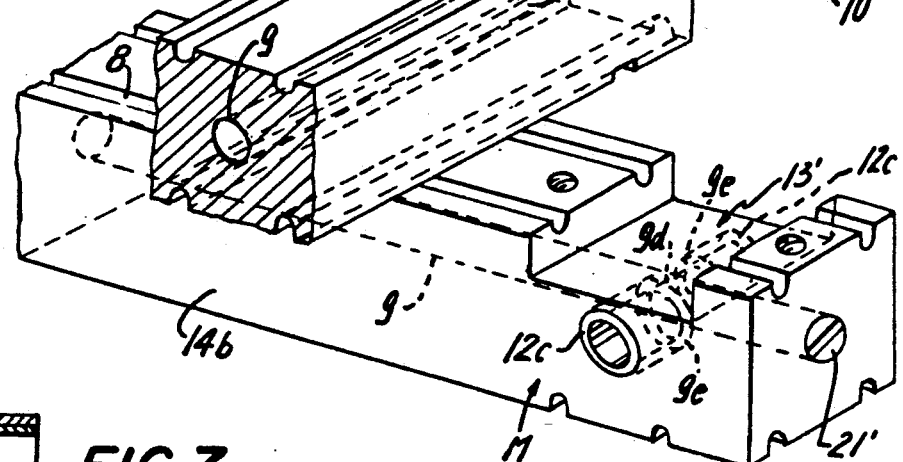
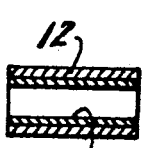

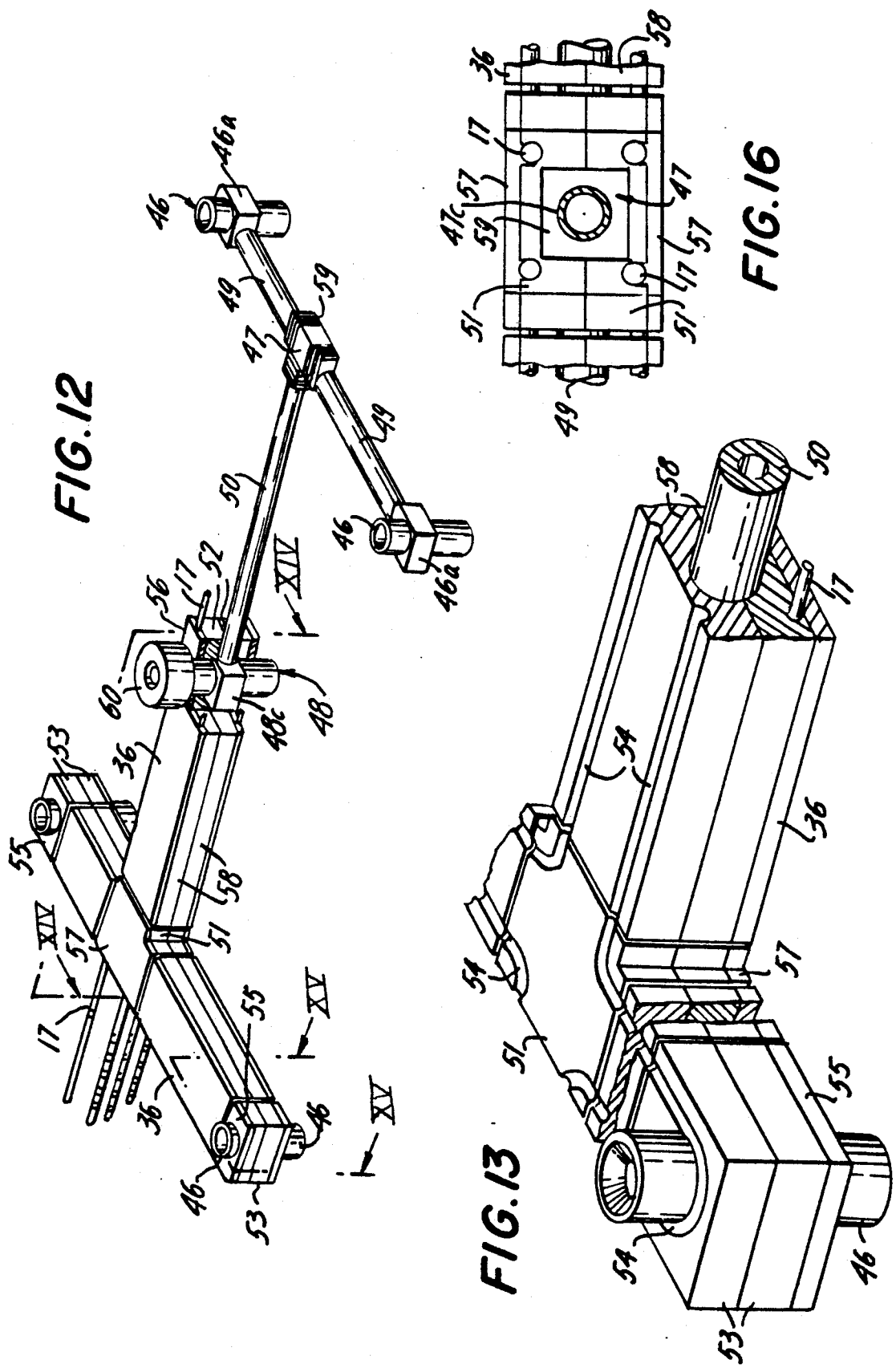

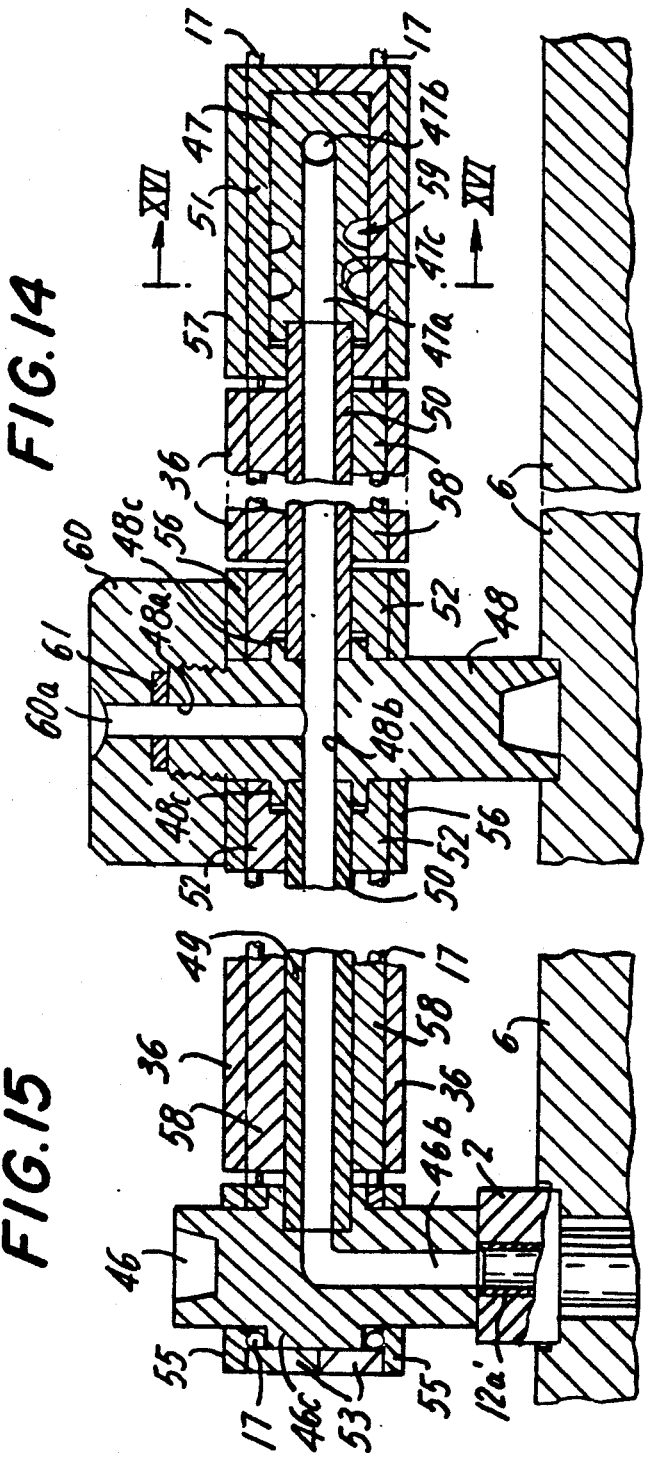

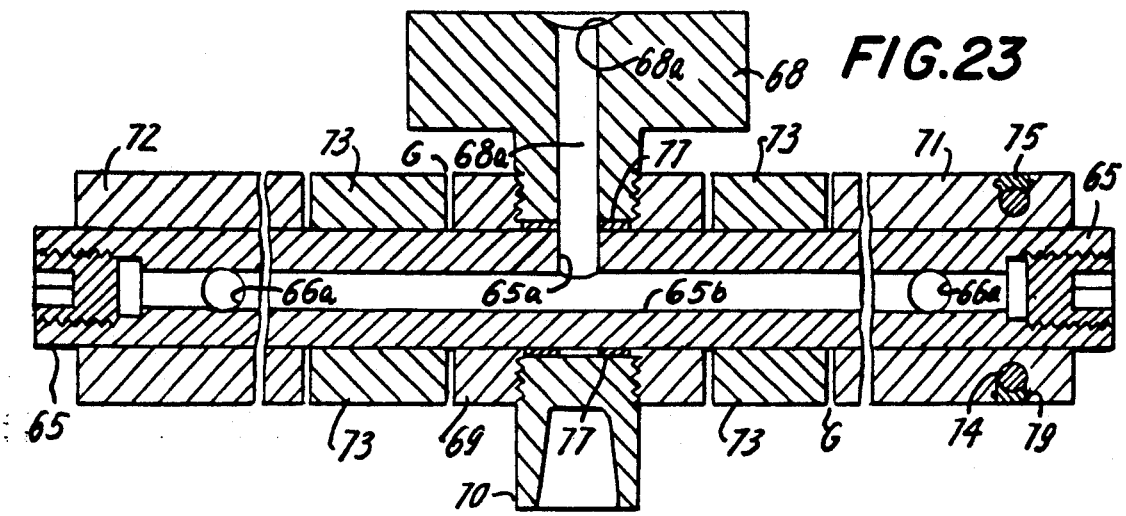
FIG.23
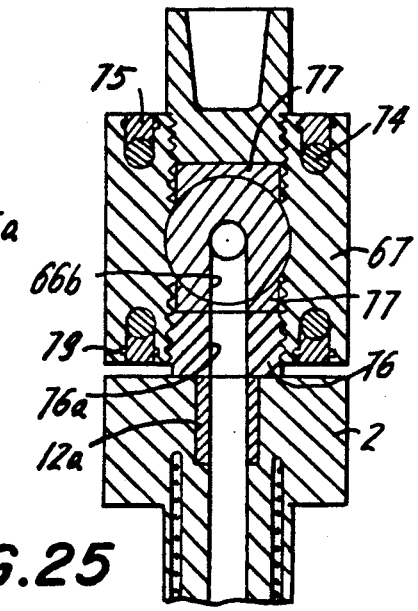
FIG.24
FIG.25
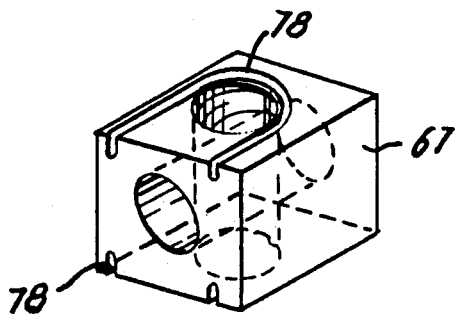
FIG.26
FIG.27

ASSEMBLY OF INJECTION MOLDING MANIFOLD, NOZZLES AND MOLD

This is a division of my copending Ser. No. 07/379,739 filed Jul. 12, 1989 now U.S. Pat. No. 5,032,078 which is a continuation-in-part of Ser. No. 217,372, filed Jul. 11, 1988 now abandoned.

This invention relates generally to injection molding apparatus for producing thermoplastic products, and more particularly to heated manifolds for distributing molten plastic material from a common injection port to the various cavities of a mold.

In conventional molding practice, plastic molding material is heated to its fluid condition and forced along passages from a supply port to the cavities of a mold. When the material in the mold cavities has solidified, material in passages extending to the cavities also solidifies and is ejected at the end of each molding cycle. The solidified material that was in the passages must be removed from the molded products. It is commonly ground into molding powder for reuse. That practice inherently involves considerable unproductive effort.

More recently, heated nozzles have come into use that extend directly to each mold cavity. Only the material in the cavities solidifies, thereby avoiding the removal and reuse of solidified scrap extending from the molded parts. A manifold is used for providing heated passages for conveying fluid resin from a common supply port to the nozzles.

Manifolds have been made of a block of steel that is bored to provide the passages for the molding material. The manifold is heated by electric heating elements in grooves in the manifold's steel block. The unitary block of steel securely contains the fluid in the manifold's passages, despite pressures of perhaps two thousand pounds per square inch. Where the passages extend from the bores of the manifold into the manifold's nozzles, the abutting surfaces of the parts are made flat with high precision and securely clamped together to prevent leaks. The same care in avoiding leaks must be observed where two or more blocks are combined in a manifold.

Great care is needed in heating a manifold so that the temperature of the passages is uniform throughout. If the manifold is heated unevenly, some portions may be so hot that the material is damaged and some portions may be so cool that the material is not sufficiently fluid and, once again, the material may be damaged by friction-induced heating. A lot of attention has been devoted to the development of standardized manifold blocks, particularly the shape of these heated manifolds, in order to optimize the ratios of the wattage requirements versus the mass, on the type of heaters employed, as well as methods to keep the manifolds from distorting due to differences in expansion as the manifolds are being heated to running temperatures. The manufacture of heated manifolds has become more complex as new developments have been introduced and costs have escalated accordingly.

An object of the invention is to provide a novel heated manifold which can be produced economically and quickly. More particularly, an object of the invention is to provide a novel manifold that can be assembled of interlocking prefabricated standardized components requiring only minor machining.

A further object of the invention is to provide a component system that can be easily assembled to form a manifold that is easy to integrate with an existing or new injection mold.

An additional object of the invention is to provide a heated manifold of assembled components which is virtually leakproof under high pressures.

Another object of the invention is to provide a component system for a manifold which is structurally self-supporting.

An additional object of the invention is to provide a versatile system for constructing manifolds for conveying molten plastic resin to a number of points in the mold, adaptable to form a manifold for either a few mold cavities or many.

A further object of the invention is to provide an adjustment for the outlet point where the fluid resin leaves the manifold and enters each mold cavity.

Yet one more object of the invention is to provide easy means for assembling and disassembling the components of the manifold including the heating elements for the purpose of cleaning, repairing and adjusting the whole or part of the manifold.

Three novel injection-mold manifolds are described in detail below and shown in the accompanying drawings, as illustrative embodiments of various aspects of the invention, for achieving the foregoing objects and still other objects of the invention.

In the first of these embodiments, a novel manifold is an assembly of standardized stock components which, with only limited machining operations, can be assembled into an endless variety of manifolds. Pursuant to one aspect of the invention, a basic component of the manifold is a member of square or roughly square cross-section having a longitudinal bore, the bore being centered or nearly centered in its cross-section. Where two such stock members form a joint in the manifold, they have transverse slots or notches cut in them, each slot having essentially the same width as the width of the stock member that intersects it and the slot in one member being substantially deeper than half the height of the stock member's cross-section and the slot in the other being substantially shallower than one-half of the height of the stock member's cross-section such that, when the slotted portions of the two members are fitted in each other, the axes of the longitudinal bores of the two members are coplanar. A transverse bore is provided in one member aligned endwise with the longitudinal bore of the other member to constitute a T-shaped passage junction. The same basic junction of stock members can be repeated using additional slotted or notched stock members to form a manifold for many mold cavities, and (+) shaped passage junctions can also be constituted.

There is danger of high-pressure fluid material leaking at the junction of the bores of two assembled members of a manifold. This concern is met pursuant to a further aspect of the invention by introducing a bushing between two assembled parts, the bushing having a bore connecting bores of two assembled members, the ends of the bushing bearing against abutment surfaces around bores of the assembled members. The thermal coefficient of expansion of the bushing is substantially higher than that of the material of the joined members between the ends of the bushing. When the manifold is cool, abutment surfaces of the two assembled members are against, or nearly against, the ends of the bushing and the two assembled members are secured to each other so that the distance between their abutment surfaces is fixed, apart from thermal effects. As the manifold is heated to its operating temperature, the temperature rise causes the ends of the bushing to be pressed with enormous force against the abutment surfaces of the joined members.

In a most practical form of this construction, the bushing is contained in one member of the manifold, one end of the bushing being opposed to an internal step at an end of a bore in the containing member and the other end of the bushing is flush with an external surface of the containing member; and the other member of two joined members has an extended surface including an annular area around an end of its bore, that annular area being opposite to the second end of the bushing. The thermal coefficient of expansion of the bushing is greater than that of the containing member. Accordingly, the elongation of the bushing that occurs as the manifold is heated to its operating temperature forms secure seals at its ends.

The same thermal elongation of a bushing (greater thermal elongation than its containing component) is also used at other junctions in the mold, as where a nozzle for filling a mold cavity is fixed against another part of the manifold. The bushing might be contained in aligned bores in both a nozzle and the area of the manifold opposite to the nozzle; and the bushing may be contained wholly in the manifold opposite to the nozzle. The parts that provide abutments for the ends of the bushing are fixed to each other. At the elevated operating temperature of the manifold, the ends of the thermally elongated bushing are driven with enormous force to seal against the annular abutment areas around the bores of the assembled parts. In particular such a thermally expansible bushing is placed in each nozzle where a flat external surface of the nozzle abuts a flat surface of the manifold, a resin passage extending from the manifold into the nozzle through those abutting surfaces. When the manifold is cool, one end of the bushing rests against a recessed annular shoulder of the nozzle and the opposite end of the bushing abuts the flat surface of the manifold. This condition is realized ideally by starting with a too-long bushing in the nozzle, one end resting on the recessed annular shoulder and, with the nozzle and bushing at ambient temperature, machining the opposite end of the bushing to be flush with the flat external surface of the nozzle. In that way, optimum dimensions of the bushing and the bushing-receiving portion of the nozzle are produced without resorting to close precision in separately machining the bushing and the nozzle.

In a further aspect of the invention, the passages in a manifold of a multicavity mold are formed of tubing and fittings having brazed, welded or other fused-metal joints. Each tube is sandwiched between a pair of members having grooves that are complementary to the tube's external surface. Each tube has a close fit in the grooves of its containing members. Elongated heating elements are assembled to the elongated tube-sandwiching members. The construction promotes efficient penetration and uniform distribution of heat from the heating elements to the fluid material in the tubes.

As will be better understood from the detailed descriptions below, portions of a manifold may be subjected to distortion as the manifold is heated to its operating temperature. Harmful effects of such distortion are ameliorated pursuant to a further aspect of the invention. Novel fittings are provided joining the tubes of a tube-and-fitting manifold such that the fittings yield during the temperature rise that occurs as a manifold is heated in preparation for use. In this way, heat-induced distortion of a fabricated manifold is accommodated in the fittings; the lengths of the tubes remain straight and true and snug in the grooves of the sandwiching members that contain each tube, preserving the efficiency of heat transfer from the heaters on the sandwiching members to the passages provided by the tubes.

In another aspect of the invention represented by the third manifold detailed below, tubular members forming the resin passages in the manifold are sandwiched between conduit covers that bear heating elements. As in the second form of manifold detailed below, and the conduit covers are mutually interlocking and are formed to provide excellent heat transfer to the tubular member between them. This third illustrative manifold provides mechanical joints at each bend and branch the resin passage, omitting the brazed joints of the second form of manifold detailed below.

In all forms of manifold detailed below, heating elements extend along the components that contain longitudinal manifold passages. The heating elements typically have channels having cylindrical outer surfaces. Opposite sides of the fluid-passage-containing components ideally have channels having half-round surface; and heater covers on the passage-containing components also have half-round channels. The channels of each heater cover and on the exterior of each passage-containing portion of the manifold have a close fit to the heating element and promote uniform and efficient transfer of heat to the fluid-containing passages of the manifold.

In the third manifold detailed below, each groove that receives a heating element has an individual heater cover; the groove and the heater cover combine to provide excellent heat transfer to the conduit cover; and the heater cover is not only forced against the heater but, in addition, the metal of the heater cover is swaged into undercuts in the heater cover for stable, secure retention.

The heated nozzles are clamped between the manifold and each of the mold cavities. Adjustment can be made to the position of the nozzle tip in relation to the opening into the cavity by adding or subtracting shim washers.

BRIEF DESCRIPTION OF THE DRAWINGS

The foregoing and other objects and aspects of the invention will be better appreciated from the following detailed description of two illustrative embodiments of various aspects of the invention, reference being made in the description to the accompanying drawings. In the drawings:

FIG. 5 is a fragmentary cross-section of a joint in the manifold of FIGS. 1-3, formed largely of stock components like that in FIG. 4, as seen as the plane V—V of FIG. 2;

FIG. 5A is a somewhat simplified exploded perspective of the manifold joint represented in FIG. 5;

FIG. 6 is a fragmentary cross-section of another form of joint in a manifold formed largely of stock components like that in FIG. 4, as viewed at the plane VI—VI in FIG. 11;

FIG. 6A is a somewhat simplified exploded perspective of the manifold joint represented in FIG. 6;

FIG. 7 is a longitudinal cross-section of a modified bushing useful in FIGS. 5, 5A, 6 and 6A;

FIG. 12 is a fragmentary perspective, partly in cross-section, of a modification of the manifold in FIG. 2;

FIG. 13 is a fragmentary perspective, partly in cross-section, of portions of the manifold of FIG. 12 but drawn to larger scale;

FIGS. 14 and 15 are fragmentary cross-sections of the manifold of FIG. 12 as seen at the planes XIV—XIV and XV—XV, respectively, in FIG. 12, but drawn to larger scale; and FIG. 16 is a fragmentary cross-section of a portion of the manifold of FIG. 12 as seen at the plane XVI—XVI in FIG. 14.

FIG. 23 is a medial cross-section of the manifold of FIG. 17 at the vertical plane XXXIII—XXXIII of FIG. 17;

FIG. 24 is a fragmentary cross-section of the manifold of FIG. 17 at the vertical plane XXIV—XXIV in FIG. 17;

FIG. 25 is a fragmentary cross-section of the manifold of FIG. 17 at the vertical plane XXV—XXV in FIG. 17;

FIG. 26 is a perspective view of a component of the manifold of FIG. 17, said component also appearing in FIG. 25; and FIG. 27 is a perspective view of another component of the manifold of FIG. 17, this component also appearing in FIG. 23.

Referring now to FIGS. 1-11 of the drawings which show an illustrative embodiment of certain aspects of the invention, a manifold 1 is clamped against four nozzles 2 between a multicavity mold 6, 7 (FIGS. 3, 3A, 8 and 9) and a back plate 25. The manifold basically includes a main member 11 and two cross members 14 extending from supply nozzle 4 (FIGS. 3 and 3A) to four nozzles or feed bushings 2. Plastic resin is introduced by a supply nozzle 4 (FIGS. 3 and 3A) at high pressure, such as 2,000 pounds per square inch. The resin is molten, and it travels through the heated manifold and nozzles 2, to fill the cavities. The resin in the cavities is solidified and the molded parts are ejected when the parts 6 and 7 of the mold are separated. Spacing bars 25A at opposite sides of the assembly are interposed between back plate 25 and mold part 6, and screws 25B tighten the back plate against the manifold. Spacers 25A are not so wide as to prevent the manifold and the nozzles from being forcefully clamped together between the back plate and the mold.

Figure 1:
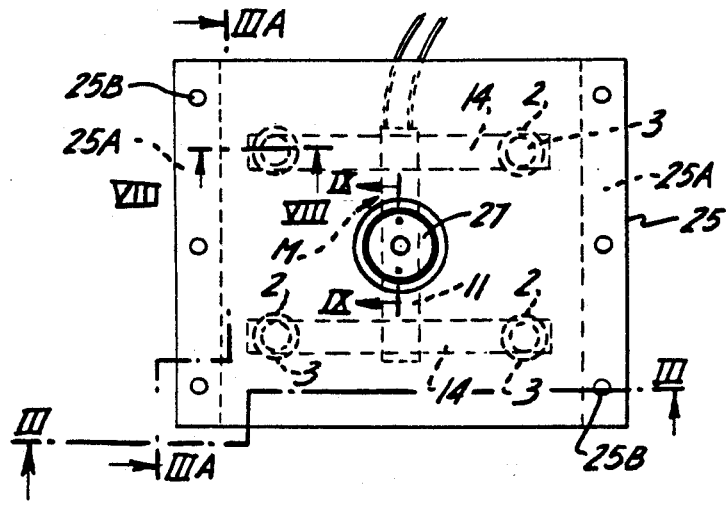
FIG. 1 is a top plan view of typical molding apparatus incorporating a novel manifold.

The manifold shown is constructed using three members M (FIGS. 2 and 4) of essentially square identical cross-section. These members M can be routinely prefabricated to accurate dimensional standards and later cut to the required lengths and modified to make manifolds of various dimensions and configurations. These members M (FIG. 4) have a pair of semi-circular grooves 8 running symmetrically along the entire length of each of two opposite sides. Each member M also has a relatively small-diameter longitudinal bore, a resin passage. Bore 9 runs along the entire length of member M and is centered in its cross-section. Member 11 and both members 14 of the manifold in FIGS. 1-11 are made of modified stock members M. Member 11 may be called the main conduit for the resin and members 14 may be called branch conduits, in this manifold.

When manufacturing a manifold of the form in FIGS. 1-11, notch or slot 10 is machined to a depth of approximately three-fourths of the height of member 11 across the width of this member at a suitable distance from its end (FIG. 5A). The width of this slot 10 equals the width of member 14 which is the same as the width of member 11. An enlarged bore 9b is formed in each end of the stock member M used for making member 11, ending at an internal annular shoulder or abutment 9c surrounding bore 9. A bushing 12 is inserted in bore 9b; one end of bushing 12 bears against shoulder 9c and its opposite end is machined to be flush with surface 10a of slot 10 at ambient temperature. The bore in bushing 12 is the same diameter as bore 9, and these bores are coaxial.

The depth of slot 10 is such that the entire end surface of bushing 12 is exposed at surface 10a. A transverse slot 13 of one-fourth of the height of member M is cut in each member 14. A transverse bore 9a is machined in each member 14, to intersect with its bore 9, the axes of bores 9 and 9a being in a common plane.

A member 14 is pressed into a respective slot 10 near each end of member 11, forming intersections as represented in FIG. 5. The axis of bore 9 in member 11 and of the coaxial bore in each bushing 12 is in a common plane that also contains the axes of bores 9 and 9a of member 14. A clamp 15 is fixed to member 11 by screws 16, across member 14. Transverse rib 15a of each clamp 15 has a tight fit in a groove 10b of member 11 (FIG. 5A) and another transverse rib 15a of each clamp 15 fits tightly against the related end of member 11. Clamps 15 complement the strength of members 11 and 14 at their joints, to prevent distortion, as insurance for securely retaining member 14 against the end of bushing 12 (FIG. 5) where bore 9a meets the bore in bushing 12. Members 11 and 14 are coplanar at their top and bottom.

Figure 2:
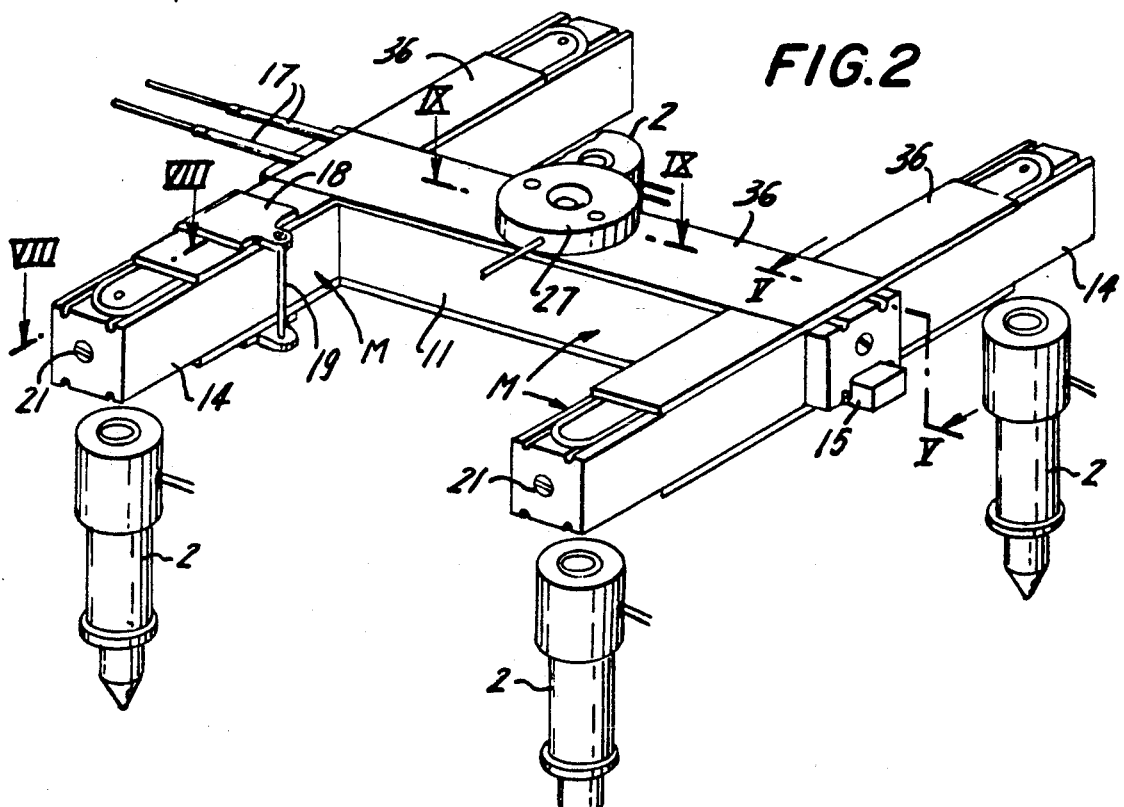
FIG. 2 is an exploded perspective of the manifold in FIG. 1 drawn to larger scale, portions of this manifold being omitted for clarity.
Figure 2A:
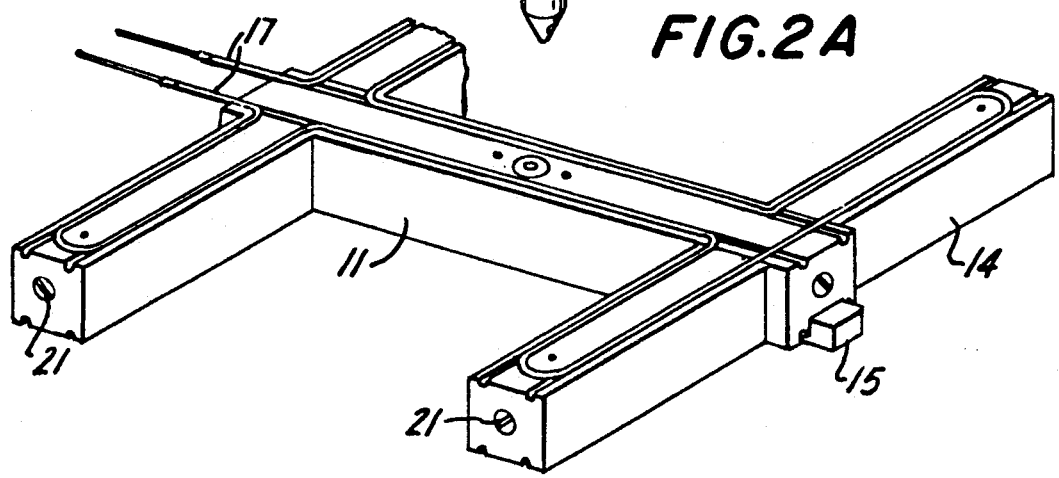
FIG. 2A is a portion of FIG. 2, omitting the nozzles and heater covers of FIG. 2.

Heaters 17 extend along grooves 8 at the top and bottom of assembled members 11 and 14 (FIG. 2A). Grooves 8 are extended by machining extensions of grooves 8 around the axes of nozzles 2 and at the intersections of member 11 and members 14. Cover plates 36 (FIGS. 2, 8, 9 and 10) are assembled to the top and bottom of members 11 and 14 along virtually the whole length of each heater 17. Each cover plate 36 has a pair of longitudinal formations 37 (FIG. 10) that provide grooves of semicircular cross-section. These formations are received in grooves 8 of members 11 and 14. Cover plates 36 are stock components as of aluminum extrusions, cut to the lengths required. Heaters 17 have cylindrical outer surfaces that have a good fit in grooves 8 and 37 so that heat is efficiently and uniformly transferred to members 11 and 14. This fit may be modified, as may be required when one member of a joint is allowed to slide slightly in the other member of that joint, as is discussed below. Cover plates 36 are fixed to members 11 and 14 by clamps 18 one of which is shown in FIG. 2. Screw 19 of clamp 18 tightens the heater cover plates against opposite sides of each of members 11 and 14.

Figure 8:
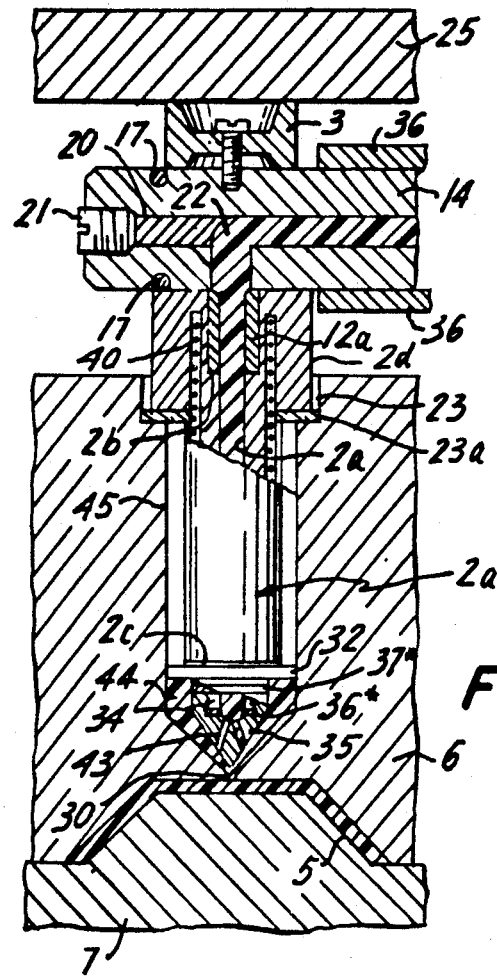
FIGS. 8 and 9 are fragmentary cross-sections of the molding apparatus of FIG. 1, drawn to much larger scale, as seen at the plane VIII—VIII and the plane IX—IX, respectively, in FIG. 1.

Bores 22 of the same diameter as bore 9 are drilled near the ends of members 14, for communicating with nozzles 2. The ends of members 14 are fitted with plugs 20 as shown in FIG. 8 and secured in place by set screws 21. This arrangement avoids pockets in the manifold where small volumes of resin might otherwise be trapped and deteriorate.

Each heated nozzle 2 containing heater 40 abuts member 14, and itself has an enlarged-diameter portion 2d that is seated in bore 23 of mold plate 6. A centering ceramic washer 23a is brazed to nozzle 2 and confined radially and axially (as shown) between the bore 23 and nozzle 2. Washer 23a itself provides heat insulation between the nozzle and mold plate 6, and it serves as a spacer to provide a heat-insulating sheath of air along the nozzle, between the nozzle and the mold plate. Another ceramic washer 32 has a brazed joint 2c to nozzle 2 near its tip, supplementing washer 23a in providing heat insulation for the nozzle.

Bushing 12a is fitted in an enlarged bore at the upper end of each nozzle, in alignment with the nozzle's bore 2a. One end of bushing 12a abuts an annular shoulder 2b of the nozzle and the opposite end of bushing 12b is flush with the flat top surface of nozzle 2 at ambient temperature and abuts the lateral surface of member 14 around bore 22.

A short cylindrical spacer 3 is fixed to member 14 along the axis of each nozzle 2. These spacers provide heat-insulating space between back plate 25 and the manifold, and they enable back plate 25 and mold plate 6 to clamp each nozzle against its portion of a member 14.

Figure 9:
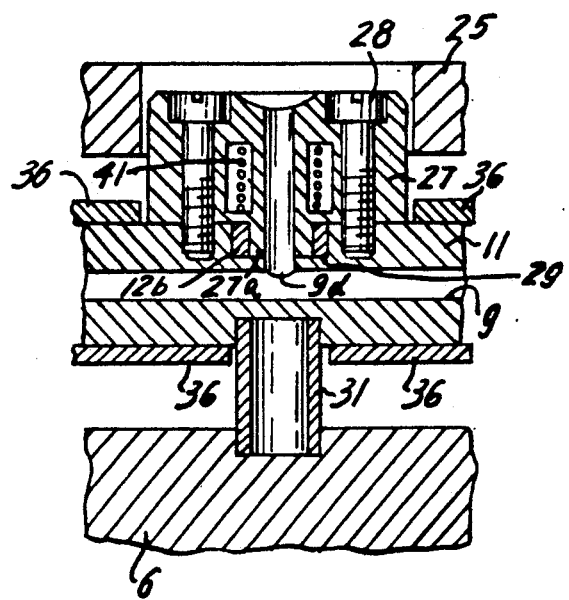

Plastic resin from a high-pressure supply is injected into the described manifold via socket or bushing 27 at a central location of the manifold, shown in FIG. 9. Bushing 27 with its internal electric heating element 41 is secured by screws 28 to main conduit member 11 of the manifold. Bore 9d is drilled into member 11 to intersect with its bore 9 and member 11 is counterbored to form a surrounding step 29. The opposite ends of bushing 12b abut step 29 and the flat surface of bushing 27 that bears against member 11. A tubular extension 27a of injection bushing 27 may extend inside bushing 12b to step 29. Tubular dowel 31 between manifold member 11 and mold part 6 resists the force of the injection nozzle 4, preventing that force from distorting member 11.

Each of the bushings 12, 12a and 12b is of a metal that has a higher linear thermal coefficient of expansion than the associated part or parts that extend between the abutment ends of the bushing. For example, these bushings may be of brass, phosphor-bronze or beryllium copper in contrast to steel used for member 11 (FIGS. 5A and 9) and for nozzle 2 (FIG. 8). These bushings 12, 12a, 12b may have a liner 39 of hardened or wear-resistant material (FIG. 7) where the resin is abrasive or corrosive. The condition of these bushings abutting against the associated parts of the manifold as described above, being flush with the external surface of its containing member, is a condition that prevails when the manifold is being made and its parts are cool, i.e., at ambient or room temperature. When the manifold is heated for conveying melted resin to the cavities, the bushings tend to elongate more than the distance between the abutments at the ends of the bushing. Consequently, looseness and minor imperfections at the abutment areas of the bushing's ends tend to become sealed due to the enormous force resulting from thermal elongation of the bushing.

Bushings 12, 12a and 12b (and bushings 12c of FIG. 6, discussed below) are of significant length, and are thus not to be confused with mere washers. As a rough rule, the length of a bushing should be such that, as the temperature rises from ambient temperature to its operating temperature—typically 350° F.—the bushing's length should increase about 0.002 inch as the result of the difference in linear thermal coefficients of expansion between the material of the bushing and the material that contains the bushing.

In each example of the thermally expanding bushing (FIG. 5A, 8 and 9), one end of the bushing abuts an internal shoulder in a component that completely contains the bushing, and the opposite end is flush with a finished surface of its containing member. In each instance, it is possible to reverse the structure, transferring the bushing to the opposite member; or one bushing might be contained partly in each of the members providing abutments for the ends of the bushing. However, having the bushing contained entirely in one member has the distinctive advantage that the external surface of the containing member and the external end of the contained bushing can be routinely and economically machined to be flush with each other at ambient temperature.

Each nozzle is securely positioned by the manifold's clamping structure so that it provides a carefully controlled orifice 38 (FIG. 8) for resin to fill a mold cavity 5. The resin passage extends from bore 2a in the nozzle via passages 43 in tip 35 to orifice 38. The nozzle 2 has a small-diameter threaded end portion 34 and a threaded tip 35 on portion 34; and washers 36* and 37* that serve a shims to locate the very end of tip 35 at an optimal position relative to orifice 38. The body of nozzle 2 has an abutment surface surrounding threaded portion 34, and portion 34 has an abutment surface at its end. These abutment surfaces are related so that companion abutment surfaces of nozzle tip 35 would engage them if there were no interposed shim washers. Accordingly, when a washer 38* and a washer 37* of equal thickness are inserted as shown, and tip 35 is tightened onto the threaded end portion 34 of the nozzle, the very end of tip 35 is moved close to the orifice. This construction allows for varied thickness of shims to be used as a means for adjusting the nozzle tip precisely in relation to the orifice 38. Tip 35 is a heated portion of the nozzle, and because it is spaced from its containing cavity 44 of mold part 6, it becomes encased in resin. That resin extends to ceramic washer 32, and serves as a heat insulator to maintain in fluid condition the resin in the path from tip 35 to orifice 38.

The manifold of FIGS. 1-10 conveys fluid resin to four cavities of a multi-cavity mold. FIG. 11 illustrates an extension of such a manifold to serve sixteen cavities. In FIG. 11, branch conduits 14a serve pairs of nozzles 2 and a subsidiary conduit 11a serves a pair of branch conduits, all as in FIGS. 1-10. Additionally, each of two supply conduits 14b supplies fluid resin to two subsidiary supply conduits 11a. Finally, main conduit 11b couples injection bushing 27 to two supply conduits 14b.

The manifold of FIG. 11—including the nozzles and the conduit for providing fluid resin to the nozzles—involves various relationships that are essentially the same as those of the apparatus in FIGS. 1-10. However, the manifold of FIG. 11 includes a joint which is shown in FIGS. 6 and 6A that is a modification of the joint in FIGS. 5 and 5A in the manifold of FIGS. 1-10. Thus, the joint in FIG. 11 as seen at the plane VI—VI may include may include one branch conduit member 14b for supplying two oppositely directed passages of a subsidiary conduit member 11a.

In FIG. 6A, member 11a—made using a stock member M—has a slot or notch 10' cut three-fourths of its thickness so that its bore 9 is interrupted at each of two flat surfaces 10a' that bound slot 10'. A slot 13' one-quarter of its thickness is cut in member 14b near each of its ends. A transverse bore 9d is drilled all across member 14b so that, when parts 11a and 14b are pressed together to form a joint, the axes of bores 9 in members 11a and 14b, and of bore 9d will all lie in a common plane. Counter-bores from opposite sides of member 14b coaxial with bore 9d will form internal annular steps or shoulders 9e in member 14b opposite sides of bore 9 in member 14b. Two bushings 12c are set into the counterbores in member 14b, one end of each bushing bearing against its internal step 9e and the opposite end of each bushing 12c being flush with a respective flat surface of member 14b.

When members 11a and 11b are pressed into assembly with each other, the external end of each bushing 12c bears against a respective surface 10a'. Accordingly, seals are formed between thermally elongated bushings 12c and those surfaces 10a' when the manifold reaches its operating temperature.

Bore 9 in member 14b forms an intersection having a supply passage to the intersection and two branch passages into the portions of bore 9 in member 11a at opposite sides of member 14b. Bore 9 in member 11a extends to the end of member 14b at the right in FIG. 6A. That passage might be used in a manifold having an intersection in the form of (+), using three branch passages extending from the intersection. However, the end of bore 9 in member 14b is not used as a passage, so a plug (see plug 20, FIG. 8) and a set screw 21' are used to close the end of bore 9 in member 14b (FIG. 6A).

In the construction of FIG. 6, as in FIG. 5, a clamp 15 is used to strengthen the joint.

Referring to FIG. 11, it may be considered that each nozzle 2 remains at a fixed location as the manifold temperature rises from ambient to its operating temperature. During this temperature rise, member 14b becomes elongated due to its elevated temperature. This elongation might tend to force members 11a at the ends of member 14b to flex outward. However, the slot 13' in member 14b (FIG. 6A) may be made a bit wider than member 11a, to allow for the thermal elongation of member 14b. Some small amount of sliding of member 14b in each member 11a may occur as the manifold becomes hot. As this occurs, the outer end of each bushing 12c would slide along its respective surface 10a'. The amount of sliding is small, smaller than the wall thickness of bushings 12c. Accordingly, the seal formed where each bushing 12c bears against a surface 10a' is maintained during the heating of the manifold.

The same provision for limited sliding may be introduced at each of the joints in the manifold of FIG. 11 between each supply conduit and the branch conduit joined to it. As a manifold becomes heated, some flexing of each elongated branch member may occur if there is no provision for sliding, and the manifold members may also slide over the surfaces of the nozzles where they abut one another. However, the construction that provides for sliding at the joints has the value of mitigating or avoiding the possibility of heat-induced distortion. One groove 8 in member 11a at the intersection should be enlarged to allow heater 17 to shift as the manifold is heated; heat-transfer paste should be used where heater 17 fits loosely in the enlarged groove.

FIGS. 12-15 represent another form of conduit for the high-pressure fluid resin. It is to be understood that this conduit is to be clamped between the back plate 25, the nozzles 2 and the mold 6, 7 as described above.

The manifold of FIGS. 12 to 16 comprises plural straight tubes 50. These tubes have an ample wall thickness to contain the high pressure of the resin that is injected and conveyed to the mold cavities. Fittings are used at each bend or intersection in the manifold's passages, so that straight tubes can be used at all other parts of the manifold.

An injection fitting 48 bears injection bushing 60 corresponding to bushing 27, except that bushing 60 is threaded onto fitting 48 with an interposed sealing washer 61. The inlet passage 60a in bushing 60 extends via bore 48a to a transverse bore 48b in fitting 48. A roughly cubic enlargement 48c (FIG. 12) at the midsection of fitting 48 has oppositely directed shallow bones coaxially aligned with bore 48b. The ends of tubes 50 are received in these shallow bores. Bores 48a, 48b and the bores in tubes 50 form continuous branching passages. Tubes 50 and fitting 48 are brazed together and sealed to be leak-proof. Fitting 48 extends down and against mold plate 6 opposite to injection bushing 60, so as to perform the function of tubular support 31 in FIG. 9. The cross-section of bushing 48 is limited (as shown) for restricting transfer of heat from the manifold to the mold plate 6.

Surrounding fitting 48 above and below enlargement 48c and tubes 50 are a pair of sandwich plates 52, conforming closely to the exterior of fitting 48 and tubes 50.

At the right in FIGS. 12 and 14 is another fitting 47 having a bore 47a aligned with the passage in tube 50 and two oppositely directed bores 47b that are aligned with the bores in opposite tubes 49. Tubes 49 and tube 50 are brazed to fitting 47, forming a "T" in the manifold's passages. Multiple grooves 59 surround each of the three intersecting bores in "T" fitting 47. Only a thin wall 47c remains at the bottom of each groove 59. Each of the three branches of fitting 47 is essentially square; it has a circular cavity that receives the end of a respective tube 49, 50; and the fitting is brazed, leak-proof, to each of the three tubes.

Additional fittings 46 are brazed to the remote ends of tubes 49, in cylindrical cavities formed in generally cubic enlargements 46a of the fittings 46. A passage 46b having a right-angle bend (FIG. 15) is aligned with the passage in tube 49 and with the passage in nozzle 2.

Fitting 46 is clamped between the back plate (not shown) of the apparatus and mold plate 6. Nozzle 2 is of the same construction as in FIG. 8 and cooperates with mold part 6 in the manner described above in connection with FIG. 8. Nozzle 2 contains a bushing 12a' that has a relatively large thermal coefficient of expansion and forms a dependable seal against fitting 46, behaving in all respects the same as bushing 12a in FIG. 8.

As seen in FIGS. 14 and 16, fitting 47 is snugly contained within two sandwich members 51. To like effect, the cubic enlargement of each fitting 46 is snugly contained between two sandwich members 53 which are complementary to the fitting.

Additionally, each length of tube 49, 50 is snugly received in complementary grooves in sandwich members 58. Clamps 18 (FIG. 2) are used in the apparatus of FIGS. 12-16 for holding cover plates 36, 55, 56 and 57 and the paired sandwich plates securely together.

Figure 10:
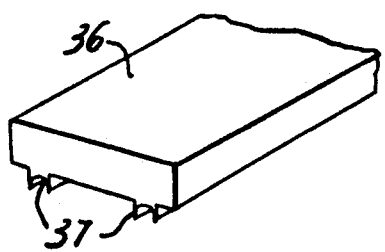
FIG. 10 is a fragmentary perspective of a component used in the manifold of FIG. 2.
Figure 11:
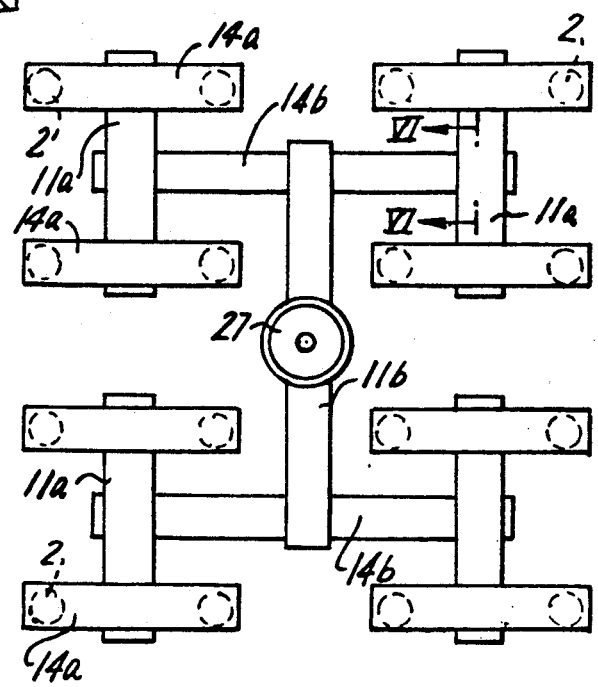
FIG. 11 is a diagrammatic representation of a more complex manifold than in FIG. 2, embodying the same system of construction.

As indicated in FIG. 13, each sandwich member 51, 52, 53 and 58 has a groove 54 for receiving heater 17 and the formation 37 of cover plate 36 (FIG. 10). Accordingly, there are paired grooves at opposite sides of sandwich members 58, i.e. at the generally flat top and bottom surfaces of members 58 that extend along tubes 49 and 50. Cover plates 36, 55, 56 and 57 over heaters 17 fit intimately against the tubes and fittings of the manifold, providing uniform and efficient heat transfer.

When fittings 46 are clamped between nozzles 2 and the back plate (not shown) of the molding apparatus, and the manifold temperature is raised from ambient to its operating temperature, tubes 50 become elongated and forcibly displace fittings 47 outward and away from injection bushing 60. This force might tend to cause tubes 49 to become bowed. But those tubes are tightly clamped in the complementary grooves of their sandwich plates. The thinned cross-section of metal 47c at the bottom of grooves 59 accommodates the elongation of tubes 50 and the resulting outward displacement (and return) of fittings 47 in relation to an imaginary straight line from one fitting 46 through fitting 47 to the opposite fitting 46 at each end of the manifold.

As a variant of both of the manifolds described above and shown in FIGS. 1-11 and FIGS. 12-16 of the drawings, it is contemplated that a pair of structural members (not shown) may be arranged parallel to passage member 11 in FIG. 2 or parallel to the main passage provided in FIG. 12 by tubes 50, each of those added members interconnecting a pair of nozzles 2 mechanically and each of those added members being heated in the same manner as the resin-conveying members of the mold. In such an arrangement, the problem of heat-induced distortion of the manifold would fade; instead, the portions of the manifold engaging the nozzles would be forced to slide a bit in relation to the nozzles during heating and cooling of the manifold.

Figure 3:
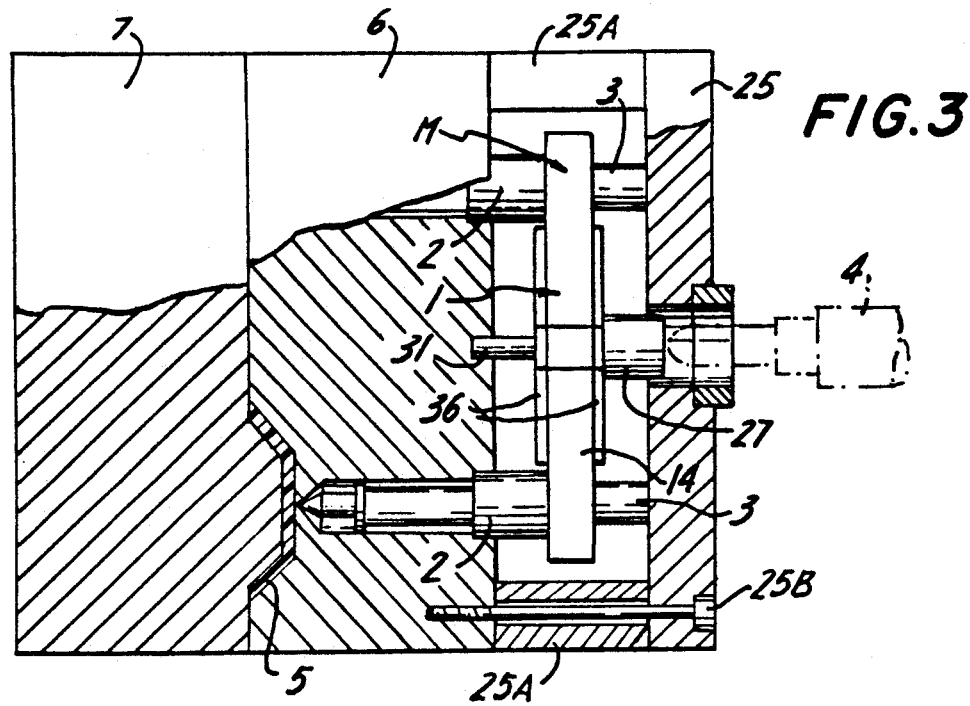
FIGS. 3 and 3A are front and left-side elevations, respectively, of the molding apparatus of FIG. 1, drawn to larger scale, this apparatus being shown partially in cross-section as seen from the plane III—III and from the plane IIIA—IIIA, respectively, in FIG. 1.
Figure 3A:
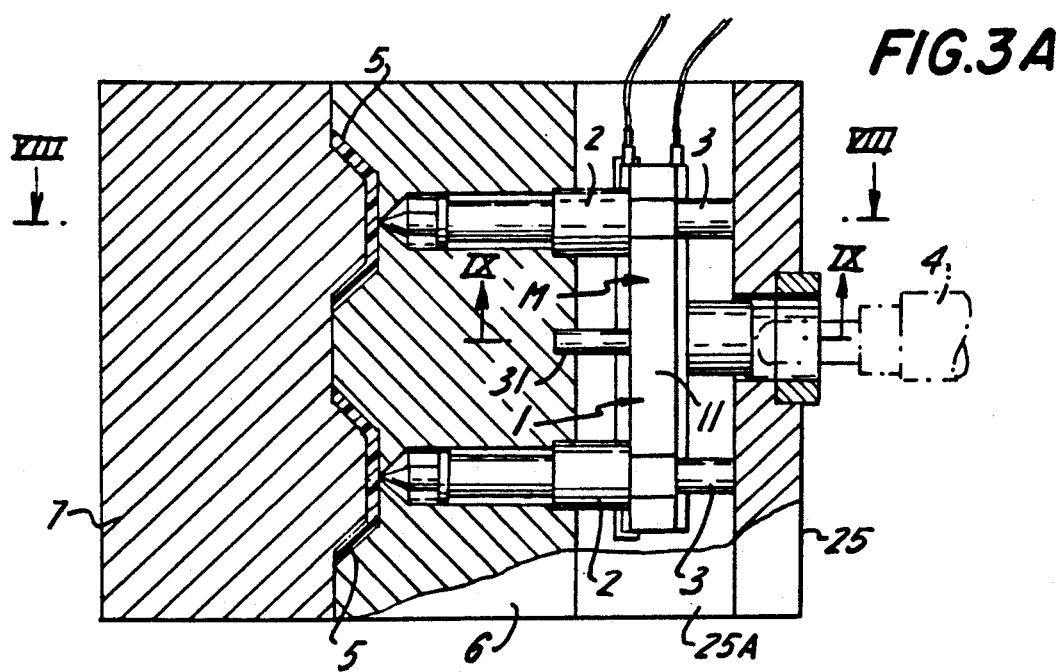
Figure 4:
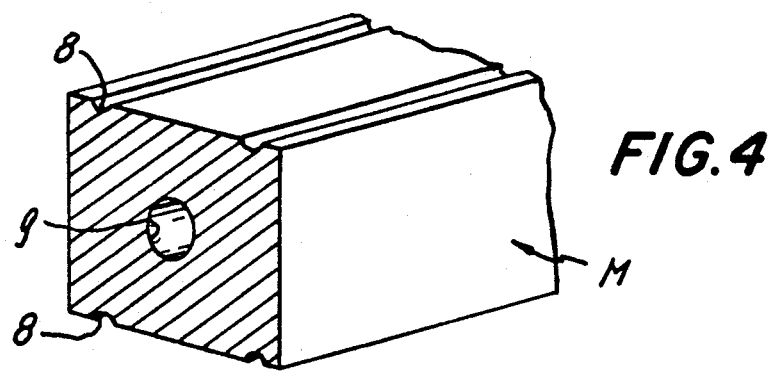
FIG. 4 is a fragmentary perspective of a stock member used as components of the manifold of FIGS. 1-3.
Figure 17:
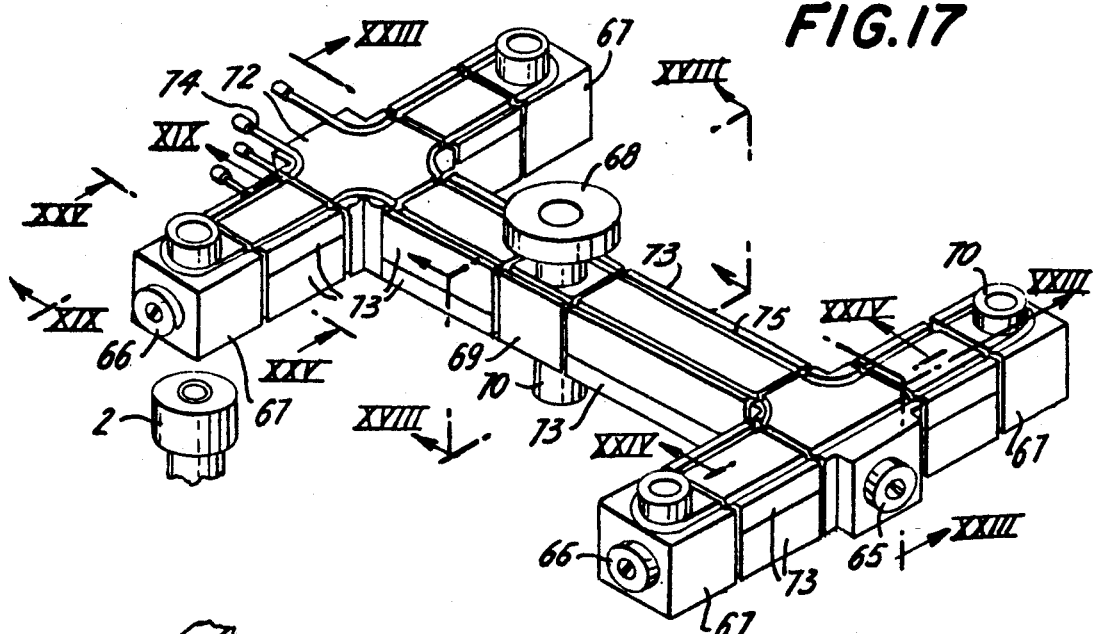
FIG. 17 is a perspective view, partly exploded, of another modification of the manifold of FIGS. 1-11 and of FIGS. 12-16.

A further manifold is shown in FIGS. 17-27, having several features in common with the manifolds of FIGS. 1-11 and 12-16 and embodying additional novel features. It is understood that, without duplicating FIGS. 1, 3 and 3A, the manifold of FIGS. 17-27—in the assembled apparatus—is clamped between a back plate 25 and a multicavity mold 6, 7 in exactly the same manner as is shown in FIGS. 1, 3 and 4 for the manifold of FIG. 2 and related Figures. In like sense, while the manifold shown in FIG. 17 includes only a fragment of one nozzle 2—the same as nozzle 2 in FIGS. 2 and 8—the manifold of FIG. 17 is normally equipped with four nozzles 2.

As with the first two manifolds described above, machine nozzle bushing 68 (FIGS. 17 and 23) provides a port through which plastic resin is injected into the manifold from a high pressure supply. Parts 68 and 70 are screwed into opposite sides of main block 69 (FIGS. 23 and 27). Part 70 is a thrust-resisting heat-insulating spacer (like spacer 3) that bears on a multicavity mold such as mold 6, 7 to resist the pressure exerted against bushing 68. Tubular metal member 65 extends horizontally through metal main block 69 between parts 68 and 70. Member 65 has a cylindrical outer surface, and metal saddles 77 are placed opposite each other, interposed between tubular member 65 and parts 68 and 70, respectively.

Figure 20:
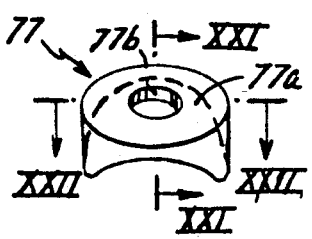
FIG. 20 is a perspective view of a component, i.e., a saddle, of the manifold of FIGS. 17-19.
Figure 21:
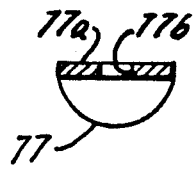
FIGS. 21 and 22 are cross-sections of the saddle of FIGS. 19 and 20 at the planes XXI—XXI and 22—22 in FIG. 20.
Figure 22:
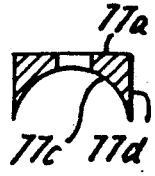

As seen in FIGS. 20-22, each saddle 77 has a flat circular face 77a, a hole 77b centered in circular face 77a, and a surface 77c whose cylindrical curvature is the same as the external surface of tubular member 65. The lateral surface 77d of saddle 77 is cylindrical, having a diameter such that the saddle slides in the threaded bores that receive parts 68 and 70, and surface 77c fits the exterior of member 65.

Components 68, 69 and 70, and two saddles 77 are assembled as shown in FIG. 23. Parts 68 and 70 have smooth flat ends that fit against the flat surfaces 78a of the respective saddles. When parts 68 and 70 are tightened, forcing saddles 77 against opposite sides of tubular member 65, the fit of the parts is such that resin-impervious seals are formed between the upper saddle 77 and tubular member 65 and between the upper saddle and bushing 68. Like seals are also formed (inconsequentially) by the lower saddle 77 to spacer 70 and to tubular member 65. When the parts are assembled as described and tightened, a hole 65a is drilled in alignment with passage 68a, so that resin injected at bushing 68 enters axial bore 65b of tubular member 65.

Figure 18:
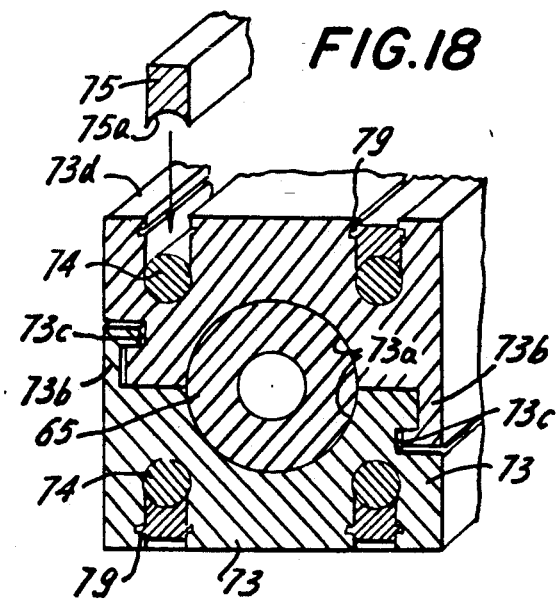
FIG. 18 is a fragmentary perspective view of the manifold of FIG. 17, partly exploded and partly in cross-section at the vertical plane XVIII—XVIII in FIG. 17 but drawn to larger scale.
Figure 19:
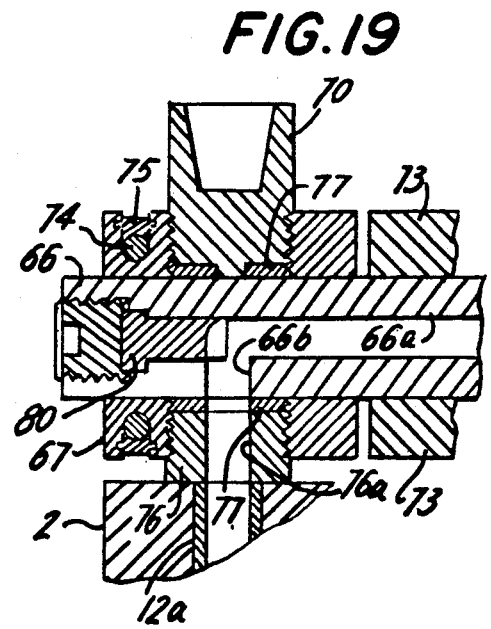
FIG. 19 is a fragmentary medial cross-section of the manifold of FIG. 17 at the vertical plane XIX—XIX in FIG. 17, to the same scale as FIG. 18.

Tubular member 65 is embraced by a pair of mutually interlocking conduit covers 73 (FIG. 18) at the left and right of main block 69 (FIG. 23). These covers should have excellent thermal conductivity and they should have a good fit against the external cylindrical surface of tubular member 65 to promote excellent heat transfer from covers 73 to member 65. In the form of FIG. 18, both covers 73 have the same cross-section that includes a semi-cylindrical trough 73a which matches the cylindrical exterior of tubular member 65. Both covers 73 have L-shaped rails 73b and formations complementary to the rails including grooves 73c. The dimensions of rails 73b and their shape and location in relation to grooves 73c are such that troughs 73a have excellent firm thermal contact to tubular member 65. Covers 73 are of aluminum in this example, thus providing excellent thermal conductivity, and they are extrusions, thus being low in cost and highly precise. Because of the precision, the troughs 73a have continuous contact with member 65, and the precise and consistent dimensions result in members 73 being held snugly in assembly to each other and against tubular member 65.

One procedure of assembling conduit covers 73 to member 65 is as follows. With block 69 already in place on member 65, one member 73 is placed against tubular member 65 and the other member 73 of the pair is slid along member 65 so that the L-shaped rail of the moving member telescopes into the complementary groove in member 73 that was initially applied to member 65; and the L-shaped rail of the initially placed member 73 is received in the complementary groove 73c of the moving member 73. The cross-section of the L-shaped rails is sufficiently limited so that they can yield, in being forcibly assembled to a tubular member.

Covers 73, as well as main block 69 and the other blocks that comprise the manifold, have heater channels that receive continuous flexible rod-like electrical heating elements 74 at the top and bottom of the manifold. The bottom of each channel is concave and semi-cylindrical, having the same curvature as the cylindrical heating elements 74; and a cover or retainer 75 fits in each channel, having a concave semi-cylindrical recess 75a (FIG. 18) that matches the curvature of the heating elements 74. Heater retainers 75 in the present example are aluminum extrusions that have a precise snug fit in the heater receiving grooves. This is a configuration that promotes excellent heat transfer from the heating element 74 to the main block 69. The same configuration is provided at each of the other heater-bearing members of the manifold.

Members 73 have grooves or undercuts 79 in their heater channels, slightly below the surface (e.g. surface 73d, FIG. 18) cut by the heater-receiving channel. A hammer and a round-end punch are used to press member 75 firmly against heater 74 and, in the same operation, to deform the metal of element 75 so that it flows locally into grooves 79. This operation is repeated from point to point all along the heaters. The result is an inexpensive and secure assembly that provides virtually ideal heat transfer from the heater to the manifold structure.

At the right in FIGS. 17 and 23, there is a metal "T" block 71 that unifies tubular member 65 to two oppositely extending tubular members 66 (FIG. 24). A bore in block 71 has a close fit against tubular member 65 for efficient transfer of heat, from heaters 74 to the portion of tubular member 65 that is contained in block 71. A bore in block 71 at right angles to member 65 is internally threaded to receive threaded tubular members 66. Paired saddles 77 are interposed between the ends of members 66 and tubular member 65. Transverse bores 65c in member 65 extend passage 65a into members 66. When the assembly of FIG. 24 is tightened, the main conduit 65b of the manifold extends into two branch conduits 66a. The end of member 65 at the right in FIG. 23 is suitably blocked, as by the threaded plug shown.

What has been said above concerning "T" block 71 and its tubular members 66, etc. applies equally to "cross" block 72 at the left in FIGS. 17 and 23. These blocks differ only with respect to the details of their grooves that receive segments of heaters 74.

The tubular members 66 extend to four gate blocks 67 (FIGS. 17). A respective tubular member 66 (FIGS. 19, 25 and 26) extends through gate block 67 from a block 71 or 72 via a pair of conduit covers 73. At its end, bore 66a is shut by a plug 80 and a set screw. Heat insulating spacer 70 is threaded into the top of block 67 and gate coupling 76 is threaded into the bottom of block 67. These threaded parts have flat ends that bear against saddles 77 at opposite sides of tubular member 66. The flat ends of parts 70 and 76 form seals against the flat faces of the saddle and the opposite concave semi-cylindrical surfaces 77c of saddles 77 form seals to tubular member 66, preventing the escape of high-pressure heated resin. These assembled parts provide a portion of the manifold conduit between passage 66a and nozzle 2, including bores 66b and 76a in parts 66 and 76, respectively. Heater grooves 78 (FIG. 26) are provided in the top and bottom of block 67, to receive segments of heaters 74, fixed in place by heater covers 75. The elongated heaters 74, grooves 78 and covers 75 in FIG. 26 have a U-shaped configuration. In general, the heating members, the grooves that receive them, and the heater covers have straight portions and portions that have a lengthwise curved configuration (see FIG. 17) as may be required for heating the resin-conveying passages of the manifold.

A nozzle 2 with its thermally responsive bushing 12a bears against a flat surface of gate coupling 76 and forms a seal against escape of high-pressure resin. In this respect, gate coupling 76 forms part of the manifold that can slide relative to the upper end of nozzle 2, as discussed above, in relation to the manifold of FIGS. 1-11.

Spacers 70 and nozzles 2 grip the manifold, when assembled to a back plate (e.g. back plate 25) and a multicavity mold (e.g. mold 6, 7). Depending on many conditions, there may be a significant increase of length of the manifold from block 71 to block 72 when the apparatus is being heated in preparing it for operation, manifold temperature rising from ambient to its operating temperature. Similarly, the length of the manifold may elongate on start-up, along each conduit formed by aligned tubular members 66, from one gate block 67 to the opposite-end gate block 67. When such elongations occur, the ends of tubular member 65 can be forced to slide in blocks 71 and 72, and correspondingly the remote ends of members 66 can be forced to slide relative to the assembly at each gate block 67. Such sliding is limited and does not obstruct the resin passage in the manifold at blocks 67, 71 and 72; and the integrity of the leak-proof resin-containing passage of the manifold is maintained despite such relative sliding that may occur.

The tubular members 65 and 66 in an example are of steel which has a lower thermal coefficient of expansion than conduit covers 73 which, in an example, are made of aluminum. Gaps G are provided throughout between conduit covers 73 and the adjacent blocks to allow for different expansions.

Blocks 68, 69, 71 and 72 in an example are of steel while saddles 77 in an example are of brass or bronze. Accordingly, the seals provided by saddles 77 become tighter and more secure as the manifold temperature rises from ambient to its operating condition.

The manifold of FIGS. 17-27 is remarkably flexible, in that it is constructed of standardlized components that may be used (with only slight modifications of members 65, 66 and 73) to make a wide range of manifolds, as suggested by FIG. 11. Tubular members 65 and 66, conduit covers 73, and heater covers 75 can all be produced with uniformity and high precision by extrusion, and precise saddles 77 can be produced economically by die-casting. Standardized blocks 67, 69, 71 and 72 all have a smooth bore and a transverse threaded bore. These blocks do not require exacting precision; they can be mass-produced readily. The entire manifold is constructed of components that can be routinely and economically produced with high accuracy where accuracy is required, and the components can be readily adapted for use with molds of widely varying sizes and having widely varied numbers and arrangements of mold inlet ports. The heaters are routinely assembled to the manifold structure, and the transfer of heat to the resin conduits is highly efficient, inherently tending to provide uniform resin temperature throughout the manifold.

The presently preferred embodiments of the invention in its various aspects which are described in detail above may be modified and adapted to various forms of molding apparatus by those skilled in the art. Consequently, the invention should be construed broadly in accordance with its true spirit and scope.

What I claim is:

1. Injection molding apparatus including a mold having multiple cavities and multiple nozzles for injecting fluid resin into said cavities and a manifold having an inlet port and a metal duct structure providing passages for fluid resin from the inlet port to the nozzles, said duct structure having mutually opposite first and second surfaces, said duct structure including at least a first channel in said first surface of the duct structure, said first channel having opposite-side surfaces and a bottom and having greatly elongated undercuts in said opposite-side surfaces thereof, said undercuts being recessed from said first surface of the duct structure, said duct structure further including:

a first greatly elongated electric heating member in said first channel, and a first preformed greatly elongated heater cover disposed in said first channel and covering at least part of the length of said elongated electric heating member, said first heater cover and the bottom of said first channel having respective surfaces that conform to opposite sides of said first heating member, said first heater cover having elongated portions projecting into and extending along said undercuts, said projecting portions being positioned for snugly confining said first heating member between all of the length of said first heater cover and the bottom of said first channel so as to constitute a mechanical assembly which provides excellent heat transfer from said first elongated heating member to said duct structure, said first heater cover being of a metal adapted to flow into said undercuts in response to an applied flow-inducing force, said portions of said first heater cover that project into said undercuts being developed by flow-inducing force applied to said preformed heater cover that initially lacks said projecting portions, said flow-inducing force causing the heater cover to bear against said first elongated heating member which consequently bears against the bottom of said first channel.

2. Injection molding apparatus as in claim 1 wherein said duct structure further includes a second channel in said second surface of the duct structure, and a second greatly elongated electrical heating member and a second heater cover in said second channel, said second channel and said second heating member and said second heater cover constituting a mechanical assembly replicating said first channel and said first heating member and said first heater cover and their relationship.

3. Injection molding apparatus as in claim 1 wherein at least corresponding portions of said first channel and said first elongated heating member and said first elongated heater cover have successive points along the lengths thereof so related as to form a configuration at least part of which is curved.

4. Injection molding apparatus as in claim 3 wherein said curved configuration includes U-shaped portions at portions of said duct structure where said nozzles are located.

5. Injection molding apparatus as in claim 1 wherein said first heating member is cylindrical and wherein the surfaces of said first heater cover and the bottom of said first channel that conform to said first heating member are concave and half-round.

6. A manifold for conveying fluid resin to mold cavities, comprising an inlet port and a metal duct structure having first and second opposite surfaces and having discharge ports and passages for fluid resin extending from said inlet port to said discharge ports, said duct structure including at least a first channel in said first surface of the duct structure, said first channel having opposite-side surfaces and a bottom and having greatly elongated undercuts in said opposite-side surfaces thereof, said undercuts being recessed from said first surface of the duct structure, said duct structure further including:

a first greatly elongated electric heating member in said first channel, and a first preformed greatly elongated heater cover disposed in said first channel and covering at least part of the length of said elongated electric heating member, said first heater cover and the bottom of said first channel having respective surfaces that conform to opposite sides of said first heating member, said first heater cover having elongated portions projecting into and extending along said undercuts for mechanically retaining said heater cover fixedly in said channel, said projecting portions being positioned for snugly confining said first heating member between all of the length of said heater cover and the bottom of said channel so as to constitute a mechanical assembly which provides excellent heat transfer from said elongated heating member to said duct structure, said first heater cover being of a metal adapted to flow into said undercuts in response to an applied flow-inducing force, said portions of said first heater cover that project into said undercuts being developed by flow-inducing force applied to said preformed heater cover that initially lacks said projecting portions, said flow-inducing force causing the heater cover to bear against said first elongated heating member which consequently bears against the bottom of said first channel.

7. A manifold as in claim 6 wherein said duct structure includes a second elongated channel in said second surface of the duct structure, further including a second greatly elongated heating member and second greatly elongated heater cover in said second channel, said second channel and said second heating member and said second heater cover replicating said first channel and said first heating member and said first heater cover and their relationship.

8. A manifold as in claim 6 wherein at least corresponding portions of said first channel and said first elongated heating member and said first elongated heater cover have successive points along the lengths thereof so related as to form a configuration at least part of which is curved.

9. A manifold as in claim 6 wherein said first heating member is cylindrical and wherein said surfaces of said first heater cover and the bottom of said first channel that conform to said first heating member are concave and half-round.

10. A manifold as in claim 6, said elongated portions projecting into said undercuts being developed by said flow-inducing force applied from point to point along the heater cover.

* * * * *